Figure 1:
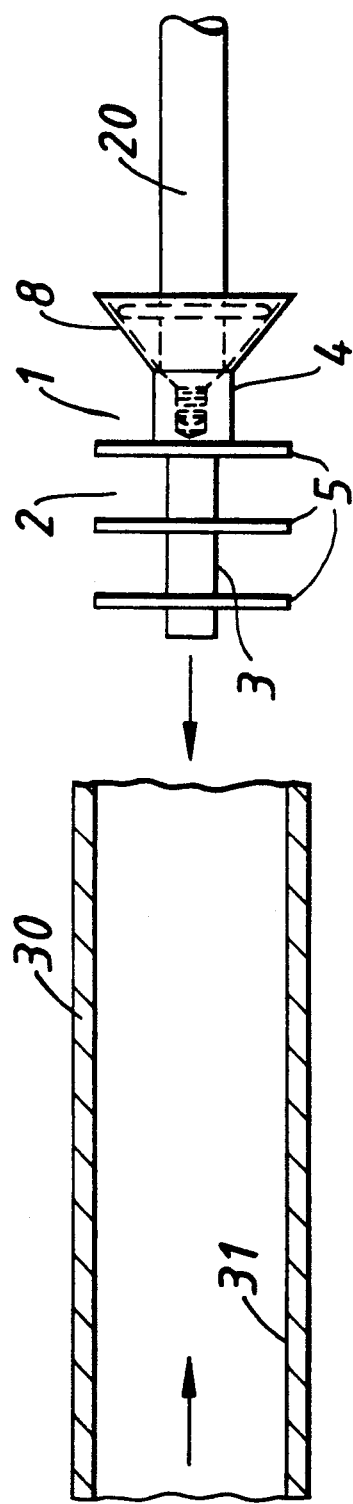

United States Patent [19]

Ashcroft

[11] Patent Number: 5,228,476
[45] Date of Patent: Jul. 20, 1993

[54] BLOCK FOR REVERSIBLY BLOCKING THE BORE OF A PIPE

[75] Inventor: Ian Ashcroft, Purley, United Kingdom

[73] Assignee: British Gas plc, England

[21] Appl. No.: 798,088

[22] Filed: Nov. 22, 1991

[30] Foreign Application Priority Data

Jan. 29, 1991 [GB] United Kingdom ............... 9101853

[51] Int. Cl.⁵ .............................................. F16L 55/18
[52] U.S. Cl. ........................................... 138/89; 137/1
[58] Field of Search ................. 138/89, 90, 91; 220/235; 137/1, 800

[56] References Cited

U.S. PATENT DOCUMENTS

| 2,107,259 | 2/1938 | Hazel ................... 138/89 |
| 2,390,461 | 12/1945 | Racz . |
| 3,032,069 | 5/1962 | Ficklin . |
| 3,358,869 | 12/1967 | Palmer et al. . |
| 3,889,714 | 6/1975 | Wilger et al. . |
| 4,237,937 | 12/1980 | Healy ................... 138/89 |
| 4,434,816 | 3/1984 | Di Giovanni et al. ...... 138/89 |
| 4,462,430 | 7/1984 | Anthony et al. ............. 138/89 |
| 4,470,946 | 9/1984 | Vassalotti et al. . |
| 4,531,550 | 7/1985 | Gartner . |
| 4,869,281 | 9/1989 | Rockower et al. . |

FOREIGN PATENT DOCUMENTS

| 211293 | 5/1957 | Australia .............. 138/89 |
| 39127/89 | 2/1990 | Australia . |
| 928969 | 6/1963 | United Kingdom .......... 138/89 |
| 1011293 | 11/1965 | United Kingdom . |
| 2132309A | 7/1984 | United Kingdom . |
| 2166513A | 5/1986 | United Kingdom . |
| 2207728A | 2/1989 | United Kingdom . |
| 2236158A | 3/1991 | United Kingdom . |

*Primary Examiner*—James E. Bryant, III
*Attorney, Agent, or Firm*—Larson & Taylor

[57] ABSTRACT

A pipe block for reversibly blocking the bore of a pipe comprises a body 2 having a shaft 3,4, a plurality, in this case three, spaced apart annular flanges 5 extending from the shaft to form a close fit with the internal wall 31 of the pipe 30 and structure in the form of a funnel 8 attached to the shaft for guiding the threaded end 23 of a rod 20 into an internally threaded bore 6 of the shaft.

5 Claims, 1 Drawing Sheet

BLOCK FOR REVERSIBLY BLOCKING THE BORE OF A PIPE

The present invention relates to a pipe block for reversibly blocking the bore of a pipe for example a pipe through which fluid flows and particularly, though not exclusively, a service pipe carrying natural gas.

UK Published Patent Application No. 2207728A described a pipe block of the above type comprising a resilient ball which is used to block the bore of a natural gas-carrying service pipe. To block the pipe bore, the ball is forced along the pipe from the gas meter tap end by gas pressure to a position where it is outside the gas consumer's premises.

The ball forms a force fit sufficient to resist any attempt to dislodge it by the pressure of the gas in the pipe.

Before it is forced up the bore of the pipe, the ball is attached to a releasable cable by means of a threaded bush held captive by the ball.

In use the cable follows the ball up to the pipe to its rest position. Once in position in the pipe bore the cable is released from the ball and is withdrawn from the pipe. The cable is provided with a stop to control the length of cable following the ball up the pipe and thereby to fix the position of the ball within the pipe bore.

To force the ball up the pipe a suitable pressure source is required such as a gas cylinder.

If it is desired to remove the ball to unblock the pipe bore, a vacuum pump is attached to the end of the pipe to suck the ball out of the pipe.

It is inconvenient to provide a gas cylinder and vacuum pump if necessary since these items are relatively expensive and cumbersome.

It is therefore an object of the present invention to provide a pipe block for reversibly blocking the bore of a pipe whereby the block can be introduced and removed by means of a rod or the like.

According to one aspect of the present invention a pipe block for reversibly blocking the bore of a pipe comprises a body having means for sealing the bore of the pipe, means for releasably engaging a rod and means for guiding the rod into the rod engaging means.

According to another aspect of the present invention, a method for reversibly blocking the bore of a pipe comprises introducing into the pipe a pipe block by means of a rod removably attached to the block, moving the block to a desired position along the pipe, disengaging the rod from the block and withdrawing the rod from the pipe.

Figure 2:
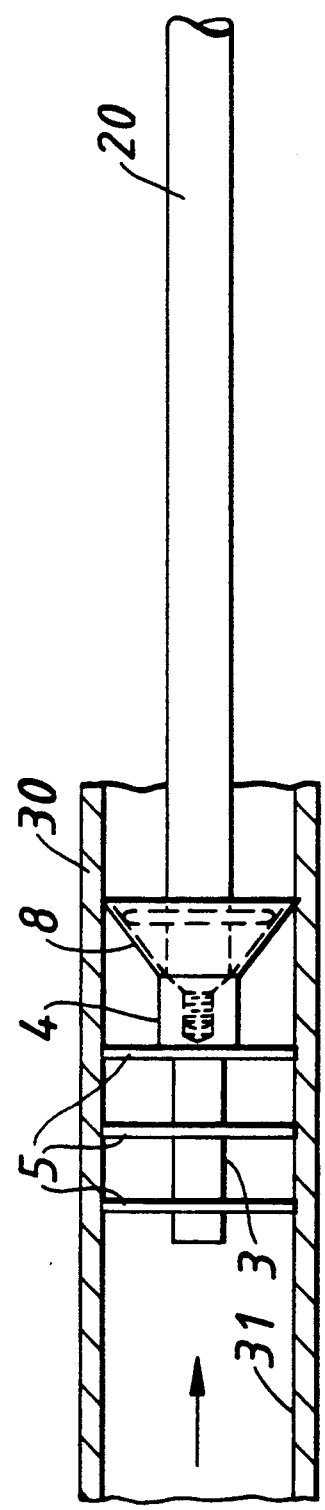
Figure 3:
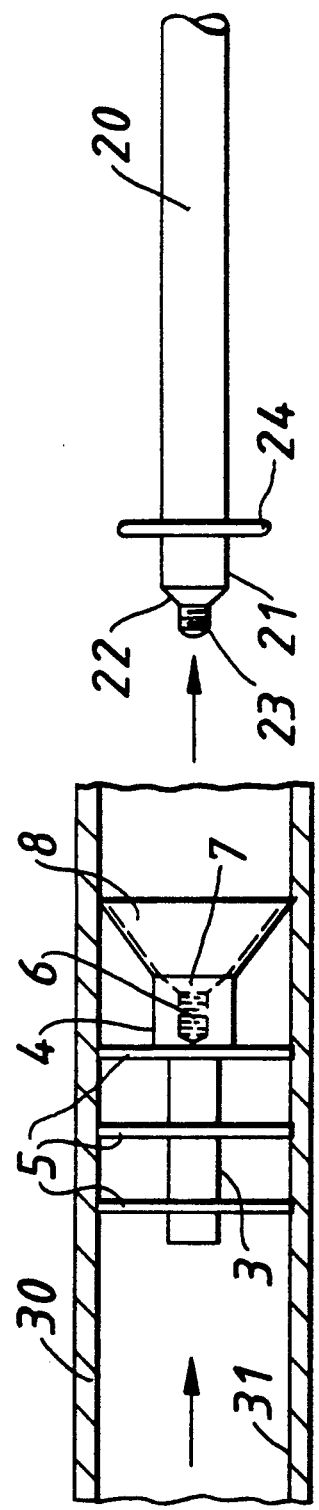

An embodiment of the invention will now be particularly described with reference to the drawings in which:

FIG. 1 is a side view of a pipe block about to be inserted by means of a suitable rod into the bore of a fluid-carrying pipe for instance a gas service pipe providing gas for consumers, FIG. 2 shows the block inserted in the pipe, and FIG. 3 shows the block in the pipe with the rod now withdrawn.

Referring to the drawings, the block 1 comprises a body 2 in the form of a cylindrical shaft of any suitable flexible tough material compatible with a gas atmosphere e.g. rubber, polypropylene, polyethylene, soft PTFE or leather, the shaft having a forward portion 3 of smaller diameter than a rearward portion 4.

Located on the forward portion 3 of the body 2 are a plurality, in this case three, spaced apart annular sealing flanges 5 of a material similar to the shaft.

The rearward portion 4 of the body 2 has an internally threaded blind bore 6 extending inwardly from an outwardly tapering entry aperture 7 located adjacent to the rear of the portion 4.

Affixed to the rear end of the body portion 4 is a truncated conical funnel 8, its narrow end being located adjacent to the rear end of the portion 4.

The funnel 8 which may be of any suitable material e.g. a polymeric material such as nylon or polypropylene provides a means for guiding the threaded end of an insertion rod into the threaded bore in the block whereby the block may be engaged by the rod and inserted into the pipe to be blocked.

A suitable version of such a rod is also shown in the drawings. The rod 20 may be of any suitable material e.g. steel when the block is to be used in straight pipes or nylon, polypropylene or a tightly coiled steel spring when the block is to be used in pipework having bends. The rod 20 has a circular section which tapers at one end 21 to form a neck 22 leading to a short threaded section 23 to engage with the internally threaded blind bore 6 in the manner shown in the drawings with the neck 22 engaging the surface of the entry aperture 7.

Located a short distance rearwardly of the end 21 of the rod 20 is a guide disc 24 of for example rubber which as shown in FIGS. 1 and 2 in use engages with the internal surface of the funnel 8.

In the use of the block 1, as an initial step, the rod 20 is screwed into the bore 6 of the block 1 as shown in FIG. 1. A gland (not shown) of suitable type may be fitted to the downstream end of the gas service pipe 30. The block 1 is then pushed into the service pipe 30 by way of the gland a sufficient distance to block the bore of the pipe 30 or as far upstream of the pipe 30 as is required as shown in FIG. 2. The diameter of the flanges 5 is chosen s that they form a close fit with the internal wall 31 of the pipe 30 and form seal blocking the flow of gas to the downstream end of the pipe 30.

Finally, as shown in FIG. 3, the rod 20 is unscrewed from the block 1 and removed from the pipe 30 leaving the block 1 in place. The gland may then be removed.

To remove the block 1 the gland is re-connected to the downstream end of the pipe 30 and the rod 20 is pushed into the pipe 30 through the gland until its threaded section 23 is guided by the funnel 8 into the threaded bore 6 of the block 1 so that the section 23 can be screwed into the bore 6. The rod 20 is then withdrawn from the pipe 30 by way of the gland thereby withdrawing the block 1 from the pipe and the gland.

The diameter of the wider end of the funnel 8 is preferably as close as possible to the diameter of the pipe bore to ensure that the threaded end of the rod is guided into the threaded bore of the block.

While not described, alternative means of permitting engagement of the rod with the block could be used e.g. a releasable hook and eye assembly, a bayonet type fitting or even an electromagnet assembly.

Unlike the prior block described in the introduction the introduction of and removal of the block described above is achieved by means of a simple rod rather than by a gas cylinder and vacuum pump.

I claim:

1. A pipe block for reversibly blocking the bore of a pipe, said pipe block comprising: a body having a shaft of flexible, tough material; at least one resilient annular flange ending from the shaft to form a close fit with the internal wall of a pipe for sealing the pipe bore; means for reversibly engaging a separate rod with said body for moving said body in the pipe bore; and means for guiding a separate rod to said rod engaging means, said guiding means comprising a funnel member attached to said body, the narrow end of the funnel member being located adjacent to said rod engaging means, and the wide end of the funnel member extending outwardly and away from said rod engaging means and having a diameter close to that of the pipe bore to ensure that a rod inserted into the pipe bore will be guided to said rod engaging means.

2. A pipe block according to claim 1 wherein said rod engaging means comprises an internally threaded bore for engaging a complementary threaded end of the rod.

3. A method of reversibly blocking the bore of a pipe which comprises:
  (a) providing a pipe block, said pipe block comprising a body having a shaft of flexible, tough material; at least one resilient annular flange extending from the shaft to form a close fit with the internal wall of a pipe for sealing the pipe bore; means for reversibly engaging a separate rod with said body for moving said body in the pipe bore; and means for guiding a separate rod to said rod engaging means, said guiding means comprising a funnel member attached to said body, then arrow end of the funnel member being located adjacent to said rod engaging means, and the wide end of the funnel member extending outwardly and away from said rod engaging means and having a diameter close to that of the pipe bore to ensure that a rod inserted into the pipe bore will be guided to said rod engaging means;
  (b) engaging a rod with said rod engaging mans;
  (c) utilizing said rod, moving the block to a desired position along the pipe;
  (d) disengaging the rod from the block; and
  (e) withdrawing the rod from the pipe.

4. A method according to claim 3 further comprising:
  (f) reintroducing a rod into the pipe;
  (g) engaging said rod with said rod engaging means; and
  (h) utilizing said rod, withdrawing the rod and attached pipe block from the pipe.

5. A method according to claim 3 wherein said pipe has bends and wherein said rod is sufficiently flexible to move the pipe block through said bends.

* * * * *